(12) United States Patent
Fink

(10) Patent No.: US 10,279,885 B2
(45) Date of Patent: May 7, 2019

(54) HELICOPTER WITH A FUSELAGE AND A COMPOSITE TAIL BOOM

(71) Applicant: AIRBUS HELICOPTERS DEUTSCHLAND GMBH, Donauworth (DE)

(72) Inventor: Axel Fink, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 565 days.

(21) Appl. No.: 15/471,354

(22) Filed: Mar. 28, 2017

(65) Prior Publication Data
US 2017/0297675 A1    Oct. 19, 2017

(30) Foreign Application Priority Data
Apr. 1, 2016   (EP) .................... 16400008

(51) Int. Cl.
*B64C 1/06*   (2006.01)
*B64C 27/04*   (2006.01)
(Continued)

(52) U.S. Cl.
CPC ............ *B64C 1/06* (2013.01); *B64C 1/069* (2013.01); *B64C 27/04* (2013.01); *B64C 27/82* (2013.01);
(Continued)

(58) Field of Classification Search
CPC ........... B64C 1/06; B64C 1/069; B64C 27/04; B64C 27/82; B64C 2001/0072; Y02T 50/43
See application file for complete search history.

(56) References Cited

U.S. PATENT DOCUMENTS

| | | | |
|---|---|---|---|
| 5,566,907 A * | 10/1996 | Marze | B64C 27/82 244/1 N |
| 5,676,335 A | 10/1997 | Murgia, Jr. et al. | |

(Continued)

FOREIGN PATENT DOCUMENTS

| | | |
|---|---|---|
| DE | 102008023629 | 11/2009 |
| DE | 202012002493 | 6/2012 |

OTHER PUBLICATIONS

Extended European Search Report for European Application No. EP 16400008.5, Completed by the European Patent Office, dated Oct. 17, 2016, 7 Pages.

*Primary Examiner* — Valentina Xavier
(74) *Attorney, Agent, or Firm* — Brooks Kushman P.C.

(57) ABSTRACT

A helicopter with a fuselage and a composite tail boom. The composite tail boom has at least a tubular tail boom cone and a composite attachment ring segment that defines a mating face which is connected to the fuselage at an associated connection interface by means of a plurality of tension members that are oriented longitudinally with respect to a longitudinal extension direction of the composite tail boom. The plurality of tension members are distributed over a perimeter of the composite attachment ring segment 7. The composite attachment ring segment has a clamp ring section with a plurality of tension member accommodations. The clamp ring section defines the mating face of the composite attachment ring segment 7. The plurality of tension members is at least partly accommodated in the plurality of tension member accommodations.

15 Claims, 6 Drawing Sheets

(51) Int. Cl.
*B64C 1/00* (2006.01)
*B64C 27/82* (2006.01)

(52) U.S. Cl.
CPC ....... *B64C 2001/0072* (2013.01); *Y02T 50/43* (2013.01)

(56) References Cited

U.S. PATENT DOCUMENTS

2004/0031879 A1    2/2004  Kay et al.
2017/0327200 A1*  11/2017  Probst ........................ B64C 1/26
2018/0244368 A1*  8/2018  Vogl ......................... B64C 11/36

* cited by examiner

HELICOPTER WITH A FUSELAGE AND A COMPOSITE TAIL BOOM

CROSS-REFERENCE TO RELATED APPLICATIONS

This application claims priority to European patent application No. EP 16400008.5 filed on Apr. 1, 2016, the disclosure of which is incorporated in its entirety by reference herein.

BACKGROUND OF THE INVENTION

Field of the Invention

The invention is related to a helicopter with a fuselage and a composite tail boom, the composite tail boom comprising at least a tubular tail boom cone and a composite attachment ring segment that defines a mating face, wherein the mating face is connected to the fuselage at an associated connection interface by means of a plurality of tension members that are oriented longitudinally with respect to a longitudinal extension of the composite tail boom, the plurality of tension members being distributed over a perimeter of the composite attachment ring segment, the helicopter comprising the features of claim 1.

Description of Related Art

Conventional helicopter design usually involves provision of a single main rotor and an auxiliary tail rotor that is adapted to counter torque and provide directional yaw control, wherein the tail rotor is mounted at a rear end of an associated supporting structure that is annexed to a given main fuselage body of the helicopter. Generally, the associated supporting structure is defined by a so-called tail boom of the helicopter and is typically implemented as a single beam element with an aft portion, where the tail rotor is located. Furthermore, a fin can be arranged at the same location as the tail rotor for providing directional stability during forward flight, thereby relieving the tail rotor and reducing power supply required for anti-torque operation. Moreover, horizontal tail planes can be arranged as well at the aft portion of the tail boom or on top of the fin in order to provide for pitch stability.

Usually, the tail boom comprises a load carrying tail boom structure that accommodates driving controls associated with the tail rotor, antennae and/or other systems. Corresponding driving shafts for driving the tail rotor are typically arranged outside and on top of this load carrying tail boom structure to allow for easy inspection and maintenance.

The load carrying tail boom structure must generally be designed according to static, dynamic and fatigue requirements, wherein especially the fatigue requirements are comparatively demanding requirements. In particular, the load carrying tail boom structure must be provided with a suitable bending and torsional stiffness, a suitable strength and an appropriate mass. In addition, operational requirements, such as corrosion resistance, ability for dismounting, ability for replacement and even interchangeability must be considered for a suitable service operation. The term "ability for replacement" generally refers to exchanging a tail boom with another one, while the term "interchangeability" generally refers to using the tail boom of one helicopter for another one.

On the basis of these design and operational requirements, two types of load carrying tail boom structures are mainly implemented, which differ from each other with respect to their structural integration within the main fuselage body. More specifically, a first type of tail boom is defined as a slim beam element that is attached on its front end to an aft and top region of the main fuselage body. This arrangement, however, leads to a reduction of a respective cabin height in the aft region of the main fuselage body and, in the case of rear loading helicopter configurations, to a reduction of a corresponding loading clearance. Such tail booms according to the first type usually comprise an essentially cylindrical cross section with a flat top or bottom base. A second type of tail boom is defined as one single boom that is attached to the main fuselage body by means of a smoothly tapered transition from the main fuselage body to the tail (so-called "fish tails"). Its cross section is, however, larger than that of the tail boom according to the first type, thus, leading to larger downloads generated by downwash of the main rotor in operation.

Usually, both types of tail booms are embodied as composite tail booms and provided with a connection interface at their transitions to the main fuselage body. Typically, there is a structural kink in the loft of the main fuselage body, which corresponds to the connection interface of the tail boom that is mounted to a corresponding connecting section of the main fuselage body. In other words, a physical separation between the main fuselage body and the tail boom is typically implemented, which allows for a separate manufacturing of the tail boom structure with respect to the main fuselage body. Such a separate manufacturing and the connection interface are advantageous in that they allow for a replacement of the tail boom, if required, and in that a suitable transportability can be guaranteed, in particular for larger sizes of helicopters.

However, in design and sizing of respective connection interfaces, it must be considered that the connection interfaces must be able to transfer, in operation of an associated helicopter, longitudinal loads arising from underlying bending loads and drag, as well as tangential loads arising from transverse shear and torsion loads. Furthermore, it must be considered in design and sizing of respective connection interfaces that tail booms according to the first type with relatively small cross sections exhibit larger interface loads in comparison to tail booms according to the second type.

As a result, two types of connection interfaces are currently available: shear type connection interfaces and tension bolt connection interfaces. Shear type connection interfaces are adapted to transfer the longitudinal and tangential loads occurring in operation by means of fasteners that are loaded by shear, i. e. wherein a given tail boom laminate is loaded by in-plane bearing. With such a shear type connection interface, a respective tail cone skin of a given tail boom is usually attached to the main fuselage body of a helicopter by means of a splice doubler. The shear type connection interface is generally considered as defining the most efficient connection interface, as splice doublers are simple and as the shear type connection interface excites little offset moments and transfers all loads by shear avoiding secondary bending and a necessity of using large and heavy bolts. However, the shear type connection interface is less appropriate in terms of tolerance, ability of replacement and interchangeability. Nevertheless, load introduction during operation requires a close fit of applied fasteners, which excites a special challenge when dealing with repeated attachment and detachment.

In contrast thereto, tension bolt connection interfaces usually employ a ring element with a side wall that typically comprises an "L-shaped" cross section, which is also referred to hereinafter as the "L-type concept". This ring element typically transfers the longitudinal and tangential loads occurring in operation from the tail boom to the main fuselage body. Therefore, the ring element comprises an elongated tubular section that is generally riveted to the tail boom, and a radially oriented flange provided at an axial end of this elongated tubular section, that is provided with through-holes. Tension bolts are mounted along the whole perimeter of the radially oriented flange through these through-holes with a generous clearance fit so as to clamp the radially oriented flange to an adjacent connecting structure of the main fuselage body. As a result, the longitudinal loads are transmitted via the tension bolts by tension, whereas the tangential loads are transmitted by means of friction, the latter being an effect of an underlying tightening torque and an associated clamp load of the tension bolts. Furthermore, for some applications the ring element realizes at the same time the function of a frame supporting deviation of longitudinal loads excited by the structural kink. A corresponding tension bolt connection interface is e. g. illustrated in the document U.S. Pat. No. 5,676,335.

Usually, the ring element is embodied as a metallic ring, typically aluminum, which is riveted to the composite tail boom. However, the combination of a comparatively highly stressed ring element made of aluminum and a composite tail boom leads to a galvanic incompatibility that results in corrosion issues, thus, requiring special surface protection means and special care and inspection during service and maintenance. Especially for oil and gas missions, the corrosion topic requires especial attention.

Furthermore, the tail boom is a structural part of a helicopter which is typically suffering from fatigue issues and the metallic ring transferring the loads to the main fuselage body is comparatively highly stressed and, thus, prone to comparatively early developed cracks during its lifetime. Such a fatigue sensitivity typically leads to heavy designs, wherein e. g. ribs are allocated within the metallic ring in order to avoid an opening effect between the flanges of the ring, and which require dedicated substantiation and validation in combination with specific inspection intervals. This procedure becomes even more complex when mixing two materials with such different fatigue and strength behavior characteristics.

Moreover, the metallic ring requires for small axial cross sections sufficient design space outside the tail boom, since attachment of the ring element to the tail boom is performed from outside of the tail boom as a consequence of the inaccessibility to the interior of the tail boom. However, build-up of the metallic ring outside of the tail boom leads to limitations for housing of a given tail rotor shaft on top of the tail boom. More specifically, advanced tail rotor shafts with larger diameters are not capable of being installed in conventional tail boom architectures. New architectures require some clearance from the tail rotor shaft to the radially oriented flange, thus, requiring larger fairings.

In addition, use of comparatively long screwed tension bolts, i. e. stretch bolts, is mandatory in order to prevent excessive loss of bolt clamping pressure. This requires use of additional spacer bushings, thus, leading to additional weight. Furthermore, the height, i. e. radial extension of the radially oriented flange of the "L-shaped" ring element, is a function of respective screw diameters and a required bearing surface for counterbalancing the moment associated to the offset between the stressed skin of the tail boom and an underlying action line of the screws. More specifically, for tail booms that are implemented in sandwich design, this offset is especially pronounced since the neutral line of a respective sandwich shell moves inwardly with respect to an outer loft of the tail boom. The offset increases the effective load at each tension screw, thus, requiring larger tension bolts and larger tightening torques to avoid unacceptable loss of friction forces, which is required for transferring shear flows, or to avoid even contact separation of the radially oriented flange to the main fuselage body.

As a result, application of the metallic ring as described above is characterized by some important drawbacks in terms of weight, integration, performance and service. Attempts were made to remedy these drawbacks by translating the L-type concept into a composite design with an underlying composite matrix, wherein the ring element still exhibits an "L-shaped" cross section, but wherein respective fiber plies are laid-up in parallel to the "L-shaped" cross section. This, however, leads to unfolding effects by means of the longitudinal loads, which excite transverse tension stresses at the transition radius from the elongated tubular section to the radially oriented flange. These transverse tension stresses directly stress the underlying composite matrix and, thus, acts directly on the weak point of the mechanical behavior of the composite matrix, leading to a comparatively low static and fatigue behavior, so that almost all usual benefits and advantages resulting from use of composite materials are lost. This effect is much more aggravated if no stiffening ribs are provided for connecting the radially oriented flange to the elongated tubular section of the ring element with composite design. In addition, especial attention has to be paid on friction loading and relaxation behavior of the composite material with regard to the transverse tension stresses excited by a respective clamping pressure that occurs as a result of the connection of the radially oriented flange in composite design to the main fuselage body.

Other solutions of tension bolt connection interfaces are characterized by the use of discrete heavy tension fittings in combination with a separate frame. In this case, the longitudinal loads are collected at a predetermined number of interconnection points, usually at least four, and transmitted by tension and friction to the main fuselage body. In other words, instead of having a continuous load transfer as in the tension bolt connection interface realization described above, a discrete load transfer is achieved, which is, however, considered as being heavier and less stiff.

BRIEF SUMMARY OF THE INVENTION

It is, therefore, an object of the present invention to provide a helicopter with a highly efficient structural design of a connection interface of a tail boom, as well as an associate connecting interface of a main fuselage body of the helicopter, the connection interface being adapted for exhibiting an improved operational behavior and mechanical efficiency compared to conventional connection interfaces.

This object is solved by a helicopter with a fuselage and a composite tail boom, the helicopter comprising the features of claim 1.

More specifically, according to the present invention the helicopter comprises a fuselage and a composite tail boom, the composite tail boom comprising at least a tubular tail boom cone and a composite attachment ring segment that defines a mating face. The mating face is connected to the fuselage at an associated connection interface by means of a plurality of tension members that are oriented longitudinally with respect to a longitudinal extension direction of the composite tail boom. The plurality of tension members is distributed over a perimeter of the composite attachment ring segment. The composite attachment ring segment comprises a clamp ring section with a plurality of tension member accommodations, wherein the clamp ring section defines the mating face of the composite attachment ring segment. The plurality of tension members is at least partly accommodated in the plurality of tension member accommodations. The composite attachment ring segment defines a radial cross section with a neutral line that is essentially oriented in parallel to the longitudinal extension direction and that comprises deviation slopes of at most 1:5 with respect to the longitudinal extension direction. Preferably, the clamp ring section comprises fiber layers that are at most deviated from the longitudinal extension direction by a slope of less than 1:5.

According to one aspect, the associated connection interface is provided as a composite design, thus, allowing to exploit the advantages of composite materials. More specifically, the associated connection interface is provided by a composite attachment ring segment and tension bolts are used for connecting the composite attachment ring segment to the fuselage of the helicopter.

Advantageously, by using a composite attachment ring segment, i. e. by an efficient application of composite materials and a target-oriented exploitation of their advantages in terms of fatigue performance, a significantly improved fatigue-insensitivity can be obtained, in particular in comparison to conventional metallic solutions. Furthermore, this composite attachment ring segment is compatible with composite tail booms, so that corrosion issues can be avoided. Advantageously, the composite attachment ring segment can be an integral part of the composite tail boom, i. e. be realized together with the composite tail boom as a single component, thus, saving some extra weight due to the absence of an additionally required interconnection means. However, a differential solution with an additional interface is still feasible and advantageous, since different manufacturing techniques can be chosen for the thin-walled tail boom shell and the relatively thick local ring segment and the manufacturing risk can be reduced to a minimum. Moreover, use of composite materials considerably reduces an overall weight in comparison to use of metallic components by about 30%. In addition, by using tension bolts for the actual attachment of the composite tail boom to the fuselage, the implemented mechanical principle is similar to conventional solutions. Thus, an easy tolerancing, assembly/disassembly, changeability and interchangeability can be guaranteed. In particular, a need of additional spacer bushings that are required for conventional solutions in order to provide for sufficient clamp length for the tension bolts in order to avoid loss of pre-torque can advantageously be avoided. This translates to an additional weight saving.

The composite attachment ring segment is preferably integrally arranged as a physical part of a respective tail cone shell that defines the composite tail boom. The composite attachment ring segment preferentially essentially represents a local pad up providing a certain local laminate thickness, which is considerably thicker in the area close to a joint plane in comparison to a skin thickness of a respective tail boom shell as such, and which preferably progressively reduces its thickness away from the joint plane towards an aft end of the composite tail boom. In the context of the present invention, the term "joint plane" is used to define a plane, wherein the associated connection interface is attached to the fuselage of the helicopter.

According to one aspect, the composite attachment ring segment shows a wedge-type cross-section and defines reinforcement plies with a maximum thickness at the joint plane, as well as a minimum thickness at a transition to a regular structure of the tail boom shell, i. e. the regular tail boom shell. Corresponding composite plies of these reinforcement plies are preferably essentially aligned longitudinally and in parallel to the tail boom shell, similar to respective plies that are forming corresponding skins of the regular tail boom shell. Thus, a negligible offset between a predetermined maximum outer dimension of the composite attachment ring segment with respect to a predetermined outer dimension of the regular tail boom shell can be realized. This allows either to install an associated tail rotor shaft closely to the regular tail boom shell, or to use newly designed tail rotor shafts with larger diameter without a need of redesigning the entire composite tail boom.

A radial cross section of the composite attachment ring segment is preferably characterized by a neutral line with small slopes with respect to a longitudinal extension direction of the composite tail boom. The longitudinal extension direction refers to a reference principal longitudinal axis of the regular tail boom cone, meaning either the longitudinal axis of the entire tail boom cross section or the loft contour of the tail boom cone in a radial cross section. The slope refers to the ratio of radial-to-longitudinal length units, the longitudinal units being measured along said longitudinal extension direction and the radial units being measured in orthogonal direction to said longitudinal units.

The wedge-type cross section is preferentially obtained by dropping, step by step, individual plies of the composite attachment ring segment. Preferably, the composite attachment ring segment with the wedge-type cross section defines a clamp ring section that preferentially exhibits a constant thickness, i. e. a clamp ring maximum thickness over a constant clamp width, and a scarf section with a variable thickness.

Manufacturing of the composite attachment ring segment is preferably accomplished by means of using two wedge-shaped preforms, which are interleaved between continuous plies of respective skins of the composite tail boom. A cross-section of the preforms shows the wedge shape. The preforms are preferentially suitably sectioned into segments, wherein tangential ends of the preforms are scarfed in order to provide for a smooth tangential transition from one segment to another. Hence, the reinforcement plies are connected to three continuous plies, which allow for direct load introduction into the respective skins of the composite tail boom. Preferably, after consolidation, the through-holes are drilled, the cut-outs are machined and the mating face is trimmed.

According to one aspect, the composite attachment ring segment defines a mating face that is preferentially oriented at least essentially in parallel to the joint plane. This mating face preferably abuts to an adjacent structural connection structure of the fuselage that is provided in the joint plane and that defines an appropriate connecting section of the fuselage. Respective composite plies of the composite attachment ring segment are preferentially oriented at least essentially perpendicular to the mating face.

Preferably, the composite attachment ring segment comprises a plurality of radially oriented cut-outs that are preferentially distributed along its entire perimeter, cutting through the entire material of the composite attachment ring segment. These cut-outs are preferably at least essentially arranged within the scarf section of the composite attachment ring segment, each having a front end portion oriented towards the clamp ring section and a rear end portion oriented towards the regular tail boom shell. Preferably, each front end portion exhibits a flat clamping face and each rear end portion exhibits an essentially elliptical shape. Between two in circumferential direction of the composite attachment ring segment adjacent cut-outs, preferably lug portions with a minimum width in the region of the front end portions and a maximum width in the region of the rear end portions are provided. Since a respective thickness of a given lug portion in the region of the front end portions corresponds to the clamp ring thickness, i. e. the maximum thickness of the composite attachment ring segment, and as the thickness of the given lug portion is smaller in the region of the rear end portions according to the reduced thickness of the scarf section, a resulting cross sectional area of the given lug portion along its longitudinal extension remains nearly constant. Hence, an underlying mechanical capacity of the given lug portions is nearly constant.

According to one aspect, the composite attachment ring segment comprises a centrally arranged through-hole for each cut-out, which is preferentially at least essentially oriented in-plane of an underlying laminate of the clamp ring section. In other words, each through-hole is preferably arranged orthogonally with respect to the mating face as well as in parallel to a longitudinal extension direction of the composite tail boom and extends from the mating face to an associated clamping face. A respective clamp ring thickness is preferably chosen in order to enable provision of sufficient residual laminate thickness at the location of each through-hole.

More specifically, through at least one and preferably through each through-hole, a tension bolt is installed. Therefore, the through-holes preferably exhibit a predetermined oversize in order to provide for sufficient clearance for bolt installation. In particular, an associated shape of each cut-out exhibits a predetermined length in the longitudinal extension direction, which is preferentially sufficient to allow for the installation of a tension bolt. Consequently, access to the tension bolts after mounting is still possible from an outside of the composite attachment ring segment. Furthermore, a predetermined width of each cut-out is preferentially chosen adequately with respect to accommodation and operation of an associated torque wrench.

Advantageously, no parasitic bending moments are present, since an underlying neutral line of the regular tail boom shell can be aligned to a respective bolt axis of the tension bolts. Thus, no bending moment needs to be compensated by contact of the mating face and the tension bolts are not overloaded. This translates to smaller tension bolts and less required tightening torque.

Each tension bolt preferably comprises an associated bolt head, or in addition or alternatively a washer element, which is in contact to a clamping face of the clamp ring section. Each tension bolt clamps the clamp ring section, i. e. respective clamp ring section material, between the mating face of the composite attachment ring segment and the clamping face of an associated cut-out provided in the clamp ring section.

A respective distance between the mating face and the clamping face defines an underlying clamping width of the tension bolts. This underlying clamping width is preferentially chosen for enabling a suitable fastening length that is adapted for preventing from losing clamp load. Thus, the laminate can be loaded in-plane, and not out-of-plane, as it is the case for conventional composite solutions. Thus, excellent in-plane mechanical properties of composite material in terms of bearing and shear strength can advantageously be exploited.

According to one aspect, an action line of a resulting longitudinal load of the composite tail boom is determined to be coincident with a respective bolt axis of each tension bolt. For a sandwich construction, this translates to a negligible offset of an outer loft of the composite attachment ring segment and an outer cone loft of the composite tail boom. Preferably, only a small offset between the outer cone loft and an interface loft of the associated connection interface occurs.

According to a preferred embodiment, at least one accommodation of the plurality of tension member accommodations is embodied as a longitudinal through-hole.

According to a further preferred embodiment, the composite attachment ring segment comprises a scarf section that is arranged adjacent to the clamp ring section. The scarf section comprises a plurality of openings. At least one opening of the plurality of openings is associated with the at least one accommodation of the plurality of tension member accommodations.

According to a further preferred embodiment, the at least one opening comprises a shaping that is adapted to allow insertion of at least one tension member of the plurality of tension members into the at least one accommodation via the at least one opening.

According to a further preferred embodiment, the at least one tension member comprises a tension bolt. The at least one opening defines at least one essentially flat clamping face in the region of the clamp ring section that is at least approximately arranged in parallel to the mating face of the clamp ring section.

According to a further preferred embodiment, the tension bolt abuts the at least one essentially flat clamping face and/or at least one washer is arranged between the tension bolt and the at least one essentially flat clamping face.

According to a further preferred embodiment, the clamp ring section comprises at least in the region of the at least one accommodation a thickness that is at least 1.5 times greater than a diameter of the tension bolt.

According to a further preferred embodiment, the composite attachment ring segment is tubular. The clamp ring section defines a maximum thickness of the tubular composite attachment ring segment. The scarf section comprises a variable thickness.

According to a further preferred embodiment, the variable thickness of the scarf section increases towards the clamp ring section.

According to a further preferred embodiment, the composite attachment ring segment comprises composite material with plies that are oriented at least essentially longitudinally with respect to the longitudinal extension direction of the composite tail boom and at least essentially in parallel to respective plies of composite material defining an outer and/or inner skin of the tubular tail boom cone.

According to a further preferred embodiment, the at least one opening comprises a cross section that is shaped in the form of an elliptic paraboloid.

According to a further preferred embodiment, at least one lug portion is arranged in peripheral direction of the composite attachment ring segment between two peripherally adjacent openings of the plurality of openings. The at least one lug portion comprises a width that increases in a direction pointing away from the clamp ring section.

According to a further preferred embodiment, the clamp ring section is provided as an integral component of the tubular tail boom cone.

According to a further preferred embodiment, the clamp ring section and the tubular tail boom cone comprise at least one composite layer that extends from the tubular tail boom cone up to the mating face of the clamp ring section.

According to a further preferred embodiment, a transition segment is arranged between the composite attachment ring segment and the tubular tail boom cone. The transition segment comprises a thickness that is at least 6 to 15 times smaller than a thickness of the clamp ring section.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
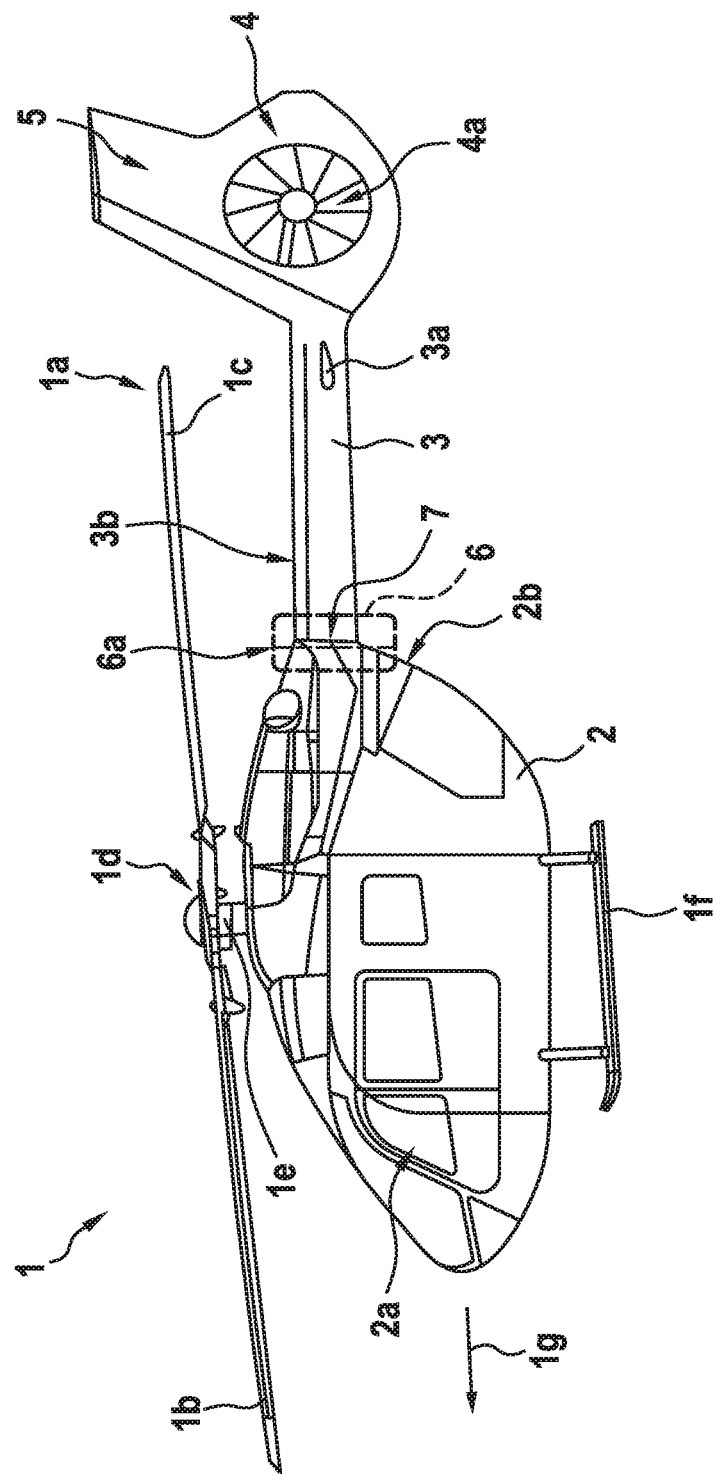
FIG. 1 shows a lateral view of a helicopter with a composite tail boom according to the invention.

FIG. 1 shows an aircraft 1 that is exemplarily illustrated as a rotary-wing aircraft and, more particularly, as a helicopter. Thus, for purposes of simplicity and clarity, the aircraft 1 is hereinafter referred to as the "helicopter" 1.

Illustratively, the helicopter 1 comprises a fuselage 2 that is connected to a landing gear 1f and defines a cabin 2a and a rear fuselage 2b. The rear fuselage 2b is connected to a tail boom 3 having a longitudinal extension direction 1g.

The helicopter 1 further comprises at least one multi-blade main rotor 1a for providing lift and forward or backward thrust during operation. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

By way of example, the helicopter 1 further comprises at least one preferentially shrouded counter-torque device 4 configured to provide counter-torque during operation, i. e. to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5. Illustratively, the tail boom 3 is also provided with a suitable horizontal stabilizer 3a.

According to one aspect, the tail boom 3 is a composite tail boom, i. e. a tail boom that comprises composite material and that is preferably at least essentially manufactured from composite material. Such composite tail booms are well-known to the person skilled in the art and, therefore, not described in further detail for brevity and conciseness.

Illustratively, the composite tail boom 3 is preferably implemented as a slim beam element essentially oriented in its longitudinal extension direction 1g, i. e. preferably at least essentially in parallel to an underlying longitudinal axis of the helicopter 1, and comprises at least a tubular tail boom cone 3b and a composite attachment ring segment 7. The composite attachment ring segment 7 preferably defines a mating face 10 that is connected to the fuselage 2 and, more specifically, the rear fuselage 2b, at an associated connection interface 6. This connection interface 6 is preferentially defined by the composite attachment ring segment 7 and connects the rear fuselage 2b at an associated interface plane 6a.

The associated interface plane 6a is preferably defined by the rear fuselage 2b. However, it should be noted that a suitable implementation of the associated interface plane 6a is well-known to the person skilled in the art and, therefore, not described in further detail for brevity and conciseness.

Figure 2:
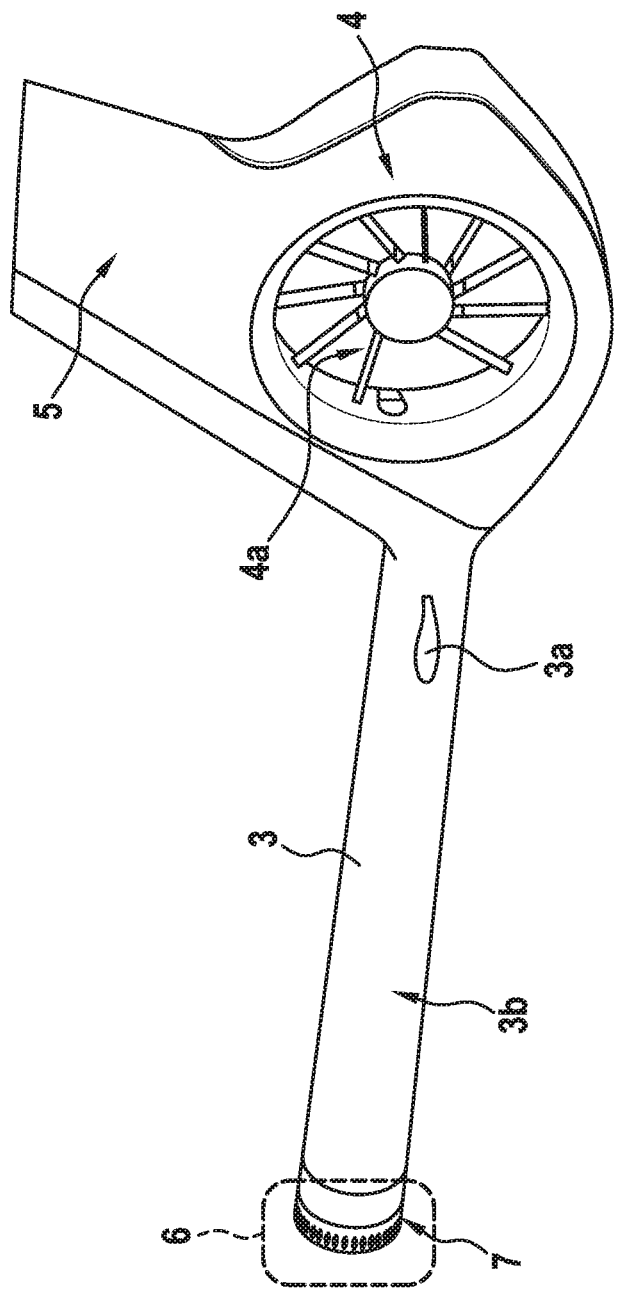
FIG. 2 shows a perspective view of the composite tail boom of FIG. 1 with a composite attachment ring segment that defines a connection interface according to the invention.

FIG. 2 shows the composite tail boom 3 that comprises the tubular tail boom cone 3b and the suitable horizontal stabilizer 3a, as well as the counter-torque device 4 and the fin 5. FIG. 2 further illustrates the composite attachment ring segment 7 that defines the connection interface 6, both of which are described in greater detail hereinafter.

Figure 3:
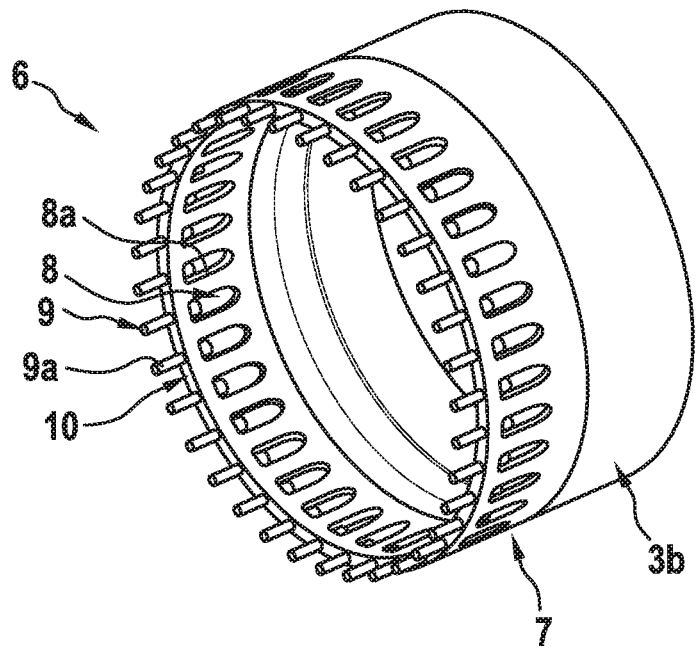
FIG. 3 shows a perspective view of the composite attachment ring segment of FIG. 2.

FIG. 3 shows the tubular tail boom cone 3b of FIG. 2 and the composite attachment ring segment 7 of FIG. 2 that defines the connection interface 6. More specifically, only a front end of the tubular tail boom cone 3b of the composite tail boom 3 of FIG. 1 and FIG. 2 is shown, for purposes of simplicity and clarity of the drawings, which is connected to the composite attachment ring segment 7.

According to one aspect, the composite attachment ring segment 7 is an integral part of the composite tail boom 3 of FIG. 2. In other words, the composite attachment ring segment 7 and the tubular tail boom cone 3b are manufactured as a single piece, i. e. a single integrated component.

Preferably, the composite attachment ring segment 7 defines a mating face 10 that is connected to the fuselage 2 of FIG. 1 via the connection interface 6 defined by the composite attachment ring segment 7. Illustratively, the mating face 10 is connected to the fuselage 2 by means of a plurality of tension members 9.

According to one aspect, at least one and, preferentially, each one of the plurality of tension members 9 is embodied as a tension bolt 9a. These tension bolts 9a are preferably arranged in a plurality of openings 8 provided in the composite attachment ring segment 7, wherein at least one opening 8a of the plurality of openings 8 comprises a cross section that is shaped in the form of an elliptic paraboloid. The plurality of openings 8 is preferentially manufactured by cutting-out, so that the openings 8 are also referred to as the "cut-outs 8" hereinafter.

Figure 4:
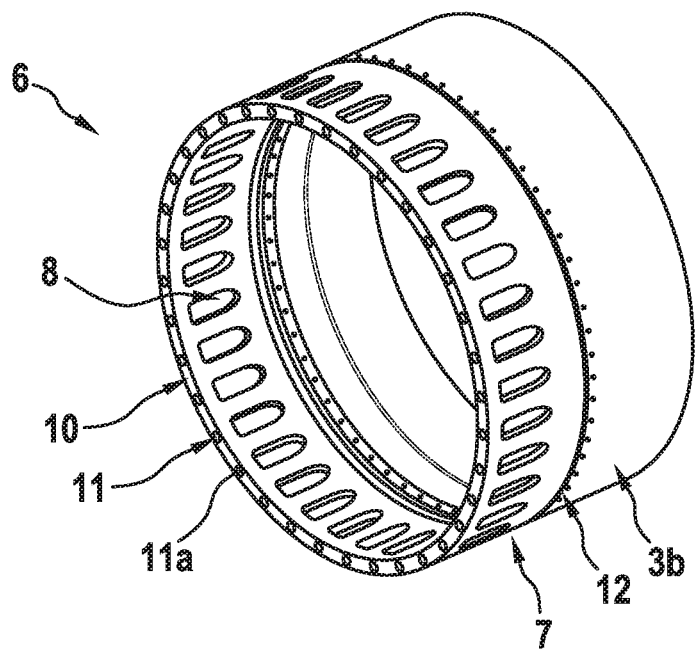
FIG. 4 shows a perspective view of the composite attachment ring segment of FIG. 3 according to an alternative implementation.

FIG. 4 shows the tubular tail boom cone 3b of FIG. 2 and the composite attachment ring segment 7 of FIG. 2 that defines the connection interface 6. Similar to FIG. 3, only a front end of the tubular tail boom cone 3b of the composite tail boom 3 of FIG. 1 and FIG. 2 is shown, for purposes of simplicity and clarity of the drawings, which is connected to the composite attachment ring segment 7.

In contrast to FIG. 3, the composite attachment ring segment 7 and the composite tail boom 3 of FIG. 2 now define separate components, which can be manufactured independent of each other. These separate components are preferably connected by means of a suitable inter segment joint 12, which is preferably implemented as a shear-type joint.

FIG. 4 further exemplarily illustrates a plurality of tension member accommodations 11, which are likewise provided in the composite attachment ring segment 7 of FIG. 3, but not designated for purposes of simplicity and clarity of the drawings. Each one of the plurality of tension member accommodations 11 is preferably associated with and provided in joint connection with a corresponding one of the plurality of cut-outs 8.

Preferably, at least one tension member accommodation 11a of the plurality of tension member accommodations 11 is provided as a longitudinal through-hole that traverses the composite attachment ring segment 7 from the mating face 10 up to the associated one of the plurality of cut-outs 8. Therefore, the tension member accommodations are also referred to as the "through-holes" hereinafter, for simplicity and clarity.

Figure 5:
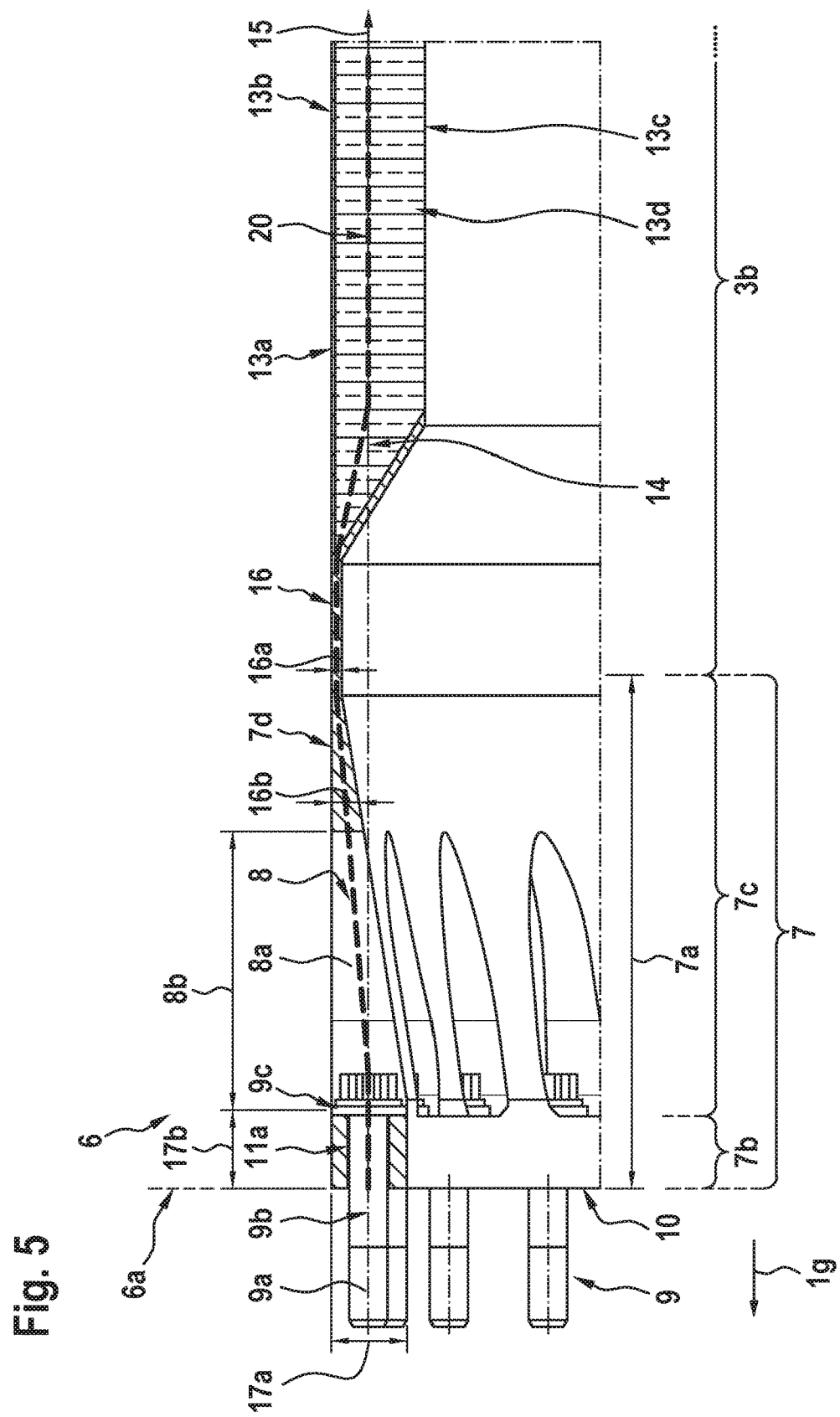
FIG. 5 shows a portion of a radial cross section of the composite attachment ring segment of FIG. 3.

FIG. 5 shows a radial cross section of the tubular tail boom cone 3b of FIG. 3 and the composite attachment ring segment 7 of FIG. 3 that defines the connection interface 6. Again similar to FIG. 3, only the front end of the tubular tail boom cone 3b of the composite tail boom 3 of FIG. 1 and FIG. 2 is shown, for purposes of simplicity and clarity of the drawings, which is connected to the composite attachment ring segment 7 that illustratively exhibits a longitudinal extension defining a length 7a of the composite attachment ring segment 7.

As described above with respect to FIG. 3, the composite attachment ring segment 7 is shown as an integral part of the composite tail boom 3, i. e. the composite attachment ring segment 7 and the tubular tail boom cone 3b are manufactured as a single piece. Nevertheless, a transition segment 16 is preferably arranged between the composite attachment ring segment 7 and the tubular tail boom cone 3b.

According to one aspect, the composite attachment ring segment 7 is tubular and comprises a clamp ring section 7b and a scarf section 7c. The clamp ring section 7b and the scarf section and, thus, the composite attachment ring segment 7 preferentially define an outer loft 7d that extends over the entire length 7a of the composite attachment ring segment 7.

Preferably, a principal longitudinal extension direction of the cross section corresponds to the longitudinal extension direction 1g of FIG. 1, which represents the extensional direction of the loft of the tubular tail boom cone 3b. A respective line of action 14 of membrane loads 15 within the tubular tail boom cone shell is essentially parallel to this extensional direction.

A neutral line 20 of the radial cross section along the composite attachment ring segment 7 and an adjacent portion of the tubular tail boom cone 3b preferably exhibits several slopes according to the different effective thicknesses of the different regions 7b, 7c, 16. The neutral line 20 corresponds to an assembly of each centroidal axis of each region. The slopes of the neutral line 20, measured with respect to the extensional direction, are preferentially essentially flat with maximum values of 1:5.

The clamp ring section 7b is preferentially provided with the plurality of through-holes 11 of FIG. 4 and defines the mating face 10 of FIG. 4. Preferably, the clamp ring section 7b comprises fiber layers that are essentially oriented in parallel to the extensional direction (and parallel to the line of action 14) but with maximum slopes of at most 1:5 with respect to the extensional direction. Furthermore, the clamp ring section 7b preferably comprises a thickness 17a that is at least 6 to 15 times greater than a thickness 16a of the transition segment 16.

Illustratively, the clamp ring section 7b is provided as an integral component of the tubular tail boom cone 3b. Therefore, the clamp ring section 7b and the tubular tail boom cone 3b preferably comprise at least one composite layer that extends from the tubular tail boom cone 3b up to the mating face 10 of the clamp ring section 7b.

According to one aspect, the scarf section 7c is arranged adjacent to the clamp ring section 7b. Preferably, the scarf section 7c comprises a variable thickness 16b and the clamp ring section 7b defines a maximum thickness of the tubular composite attachment ring segment 7, which is exemplarily designated as the thickness 17a. The thickness 17a is preferably approximately 3 times greater than the thickness 16b. The variable thickness 16b of the scarf section 7c preferably increases towards the clamp ring section 7b.

By way of example, the scarf section 7c comprises at least essentially the plurality of cut-outs 8 of FIG. 3. At least one cut-out 8a, which exemplarily exhibits a length 8b, comprises a shaping that is adapted to allow insertion of at least one tension bolt 9a of the plurality of tension bolts 9 of FIG. 3 into the at least one through-hole 11a via the at least one cut-out 8a.

The plurality of tension bolts 9 is preferably distributed over a perimeter 7f of the composite attachment ring segment 7. Furthermore, the plurality of tension bolts 9 is preferentially oriented longitudinally with respect to a longitudinal extension of the composite tail boom 3. Therefore, the plurality of tension bolts 9 is preferably at least partly accommodated in the plurality of through-holes 11. This is exemplarily illustrated in greater detail for the tension bolt 9a, which is by way of example accommodated in the through-hole 11a.

More specifically, the tension bolt 9a has a longitudinal axis 9b that is preferably at least approximately parallel to a longitudinal extension of the tubular tail boom cone 3b, i. e. the composite tail boom 3. Furthermore, an associated washer 9c is arranged on the tension bolt 9a, as further described below with respect to FIG. 6. The tension bolt 9a is preferably introduced into the through-hole 11a via its associated cut-out 8a, which allows an easy and quick access to the tension bolt 9a even after mounting of the composite tail boom 3 to the helicopter 1 of FIG. 1.

At least in the region of the through-hole 11a, the clamp ring section 7b preferably comprises a thickness 17a that is at least 1.5 times greater than a diameter of the tension bolt 9a. The thickness 17a is preferentially at least 7 times smaller than an overall length of the composite attachment ring segment 7. Furthermore, the clamp ring section 7b of the composite attachment ring segment 7 illustratively exhibits a length 17b.

According to one aspect, the composite attachment ring segment 7 comprises composite material with plies that are oriented at least essentially longitudinally with respect to a longitudinal extension of the composite tail boom 3, i. e. the tubular tail boom cone 3b, which illustratively comprises an outer loft 13a. The outer loft 13a is preferably at least approximately in line with the outer loft 7d of the composite attachment ring segment 7, which leads to a comparatively small build-up of the composite attachment ring segment 7 with respect to the regular tail boom shell. Furthermore, these plies are preferentially at least essentially oriented in parallel to respective plies of composite material defining an outer and/or inner skin 13b, 13c of the tubular tail boom cone 3b.

More specifically, the tubular tail boom cone 3*b* is preferably of the sandwich type, i. e. implemented as a sandwich laminate with the outer skin 13*b*, the inner skin 13*c* and a core 13*d*. The outer skin 13*b* defines the outer loft 13*a* and is preferably thicker than the inner skin 13*c*. The action line 14 represents a centroidal axis of the sandwich laminate of the tubular tail boom cone 3*b*, to which a respective membrane load 15 acts in operation, and which lies slightly closer to the outer skin 13*b* due to its larger thickness in comparison to the inner skin 13*c*. The sandwich laminate preferably exhibits a ramp down to a comparatively small monolithic region, which is defined by the transition segment 16.

Figure 6:
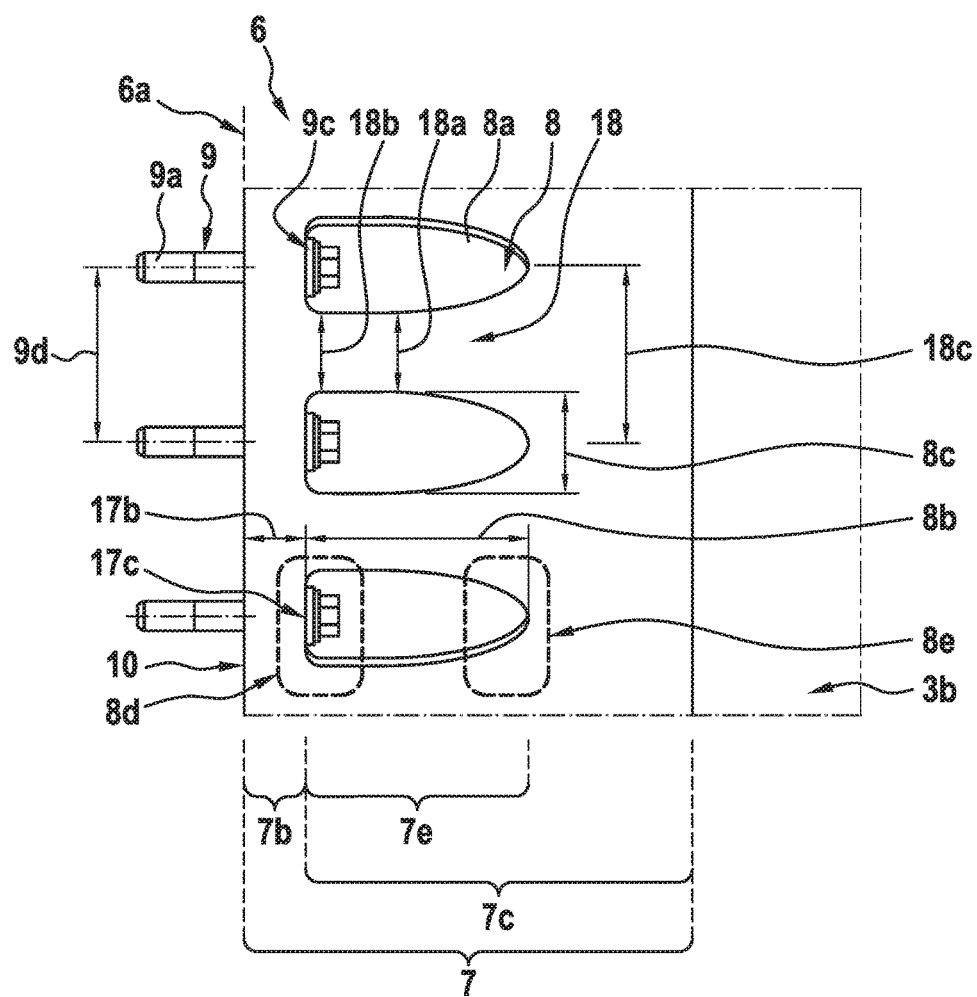
FIG. 6 shows an enlarged view of the composite attachment ring segment of FIG. 5.

FIG. 6 shows the composite attachment ring segment 7 of FIG. 5 with the plurality of tension bolts 9 that comprises the at least one tension bolt 9*a* with an exemplary bolt pitch 9*d*. FIG. 6 further illustrates the plurality of cut-outs 8 with the at least one opening 8*a*, the clamp ring section 7*b* that defines the mating face 10, and the scarf section 7*c* of FIG. 5.

Illustratively, the at least one opening 8*a* defines at least one essentially flat clamping face 17*c* in the region of the clamp ring section 7*b* that is at least approximately arranged in parallel to the mating face 10 of the clamp ring section 7*b*. Preferably, the tension bolt 9*a* abuts the at least one essentially flat clamping face 17*c* and/or the at least one washer 9*c* of FIG. 5 that is arranged on the tension bolt 9*a* and at least partly between the tension bolt 9*a* and the at least one essentially flat clamping face 17*c*.

According to one aspect, at least one lug portion 18 with a length 7*e* is arranged in peripheral direction of the composite attachment ring segment 7 between two peripherally adjacent cut-outs 8*a* of the plurality of cut-outs 8. Preferably, respective lug portions are arranged between each two peripherally adjacent cut-outs 8*a* of the plurality of cut-outs 8.

The at least one cut-out 8*a*, and preferably each one of the plurality of cut-outs 8, preferentially comprises the length 8*b*, which is illustratively defined between a front end 8*d* and a rear end 8*e* thereof, as well as a width 8*c*. The rear end 8*e* preferably exhibits an elliptical shape with no flat portion.

The length 8*b* is preferably greater than an underlying length of the tension bolt 9*a*. The at least one lug portion 18 preferentially comprises a width 18*a*, which increases from a minimum width 18*b* adjacent to the clamp ring section 7*b* in a direction pointing away from the clamp ring section 7*b* to a maximum width 18*c* adjacent to the transition segment 16 of FIG. 5. The maximum width 18*c* preferably corresponds to the bolt pitch 9*d*. This is advantageous in that is permits to keep the effective area of the material of the composite attachment ring segment 7 almost constant in order to cope with material removal arising from manufacturing of the plurality of cut-outs 8 without detrimental loss of mechanical performance.

Figure 7:
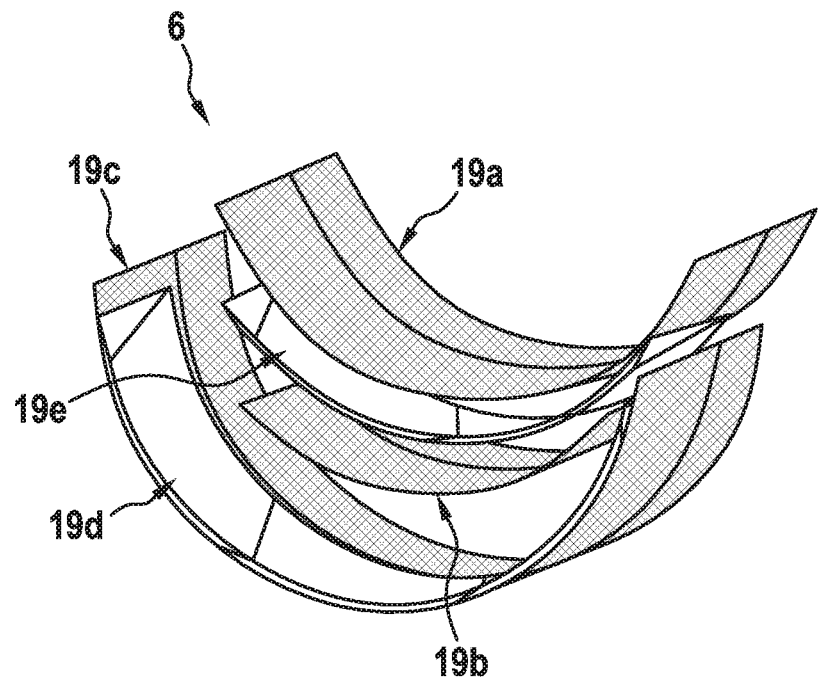
FIG. 7 shows a perspective exploded view of the connection interface of FIG. 2.

FIG. 7 shows an exemplary assembly of the connection interface 6 of the preceding figures prior to manufacturing. The assembly preferably comprises outer continuous composite layers 19*c* defining the outer loft of the composite attachment ring segment 7 of the preceding figures and the regular tail boom shell of the tubular tail boom cone 3*b* of the preceding figures. On top of these layers 19*c*, outer preforms 19*d* are placed all over the perimeter of the connection interface 6 in order to arrange a first reinforcement wedge ring. Corresponding interfaces between each outer preform 19*d* are preferably scarfed in order to provide for a smooth radial transition between the preforms. Furthermore, a continuous composite mid layer 19*b* is laid-up on top of the outer preforms 19*d* and the outer layer 19*c*.

Then, an inner reinforcement rig of a plurality of inner preforms 19*e* is placed on top of the mid layer 19*b*, with similar but staggered arrangement with respect to the outer preforms 19*d*. Finally, an inner continuous composite layer 19*a* covers the entire assembly.

Figure 8:
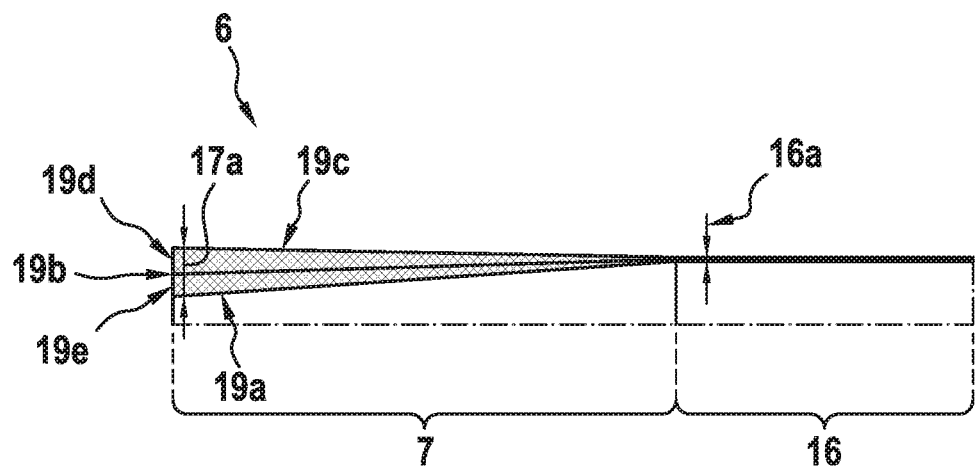
FIG. 8 shows the connection interface of FIG. 7 after assembling.

FIG. 8 shows the assembly of FIG. 7 that defines the composite attachment ring segment 7 with the transition segment 16 according to the preceding figures. The latter illustratively consists of the two wedge reinforcement elements that are defined by the inner and outer preforms 19*e*, 19*d*, which are interleaved between the three continuous layers 19*a*, 19*b*, 19*c*. The thickness 16*a* of the transition segment 16 behind the composite attachment ring segment 7 preferably comprises the thickness of each continuous composite layer 19*a*, 19*b*, 19*c*.

It should be noted that modifications to the above described embodiments are within the common knowledge of the person skilled in the art and, thus, also considered as being part of the present invention.

REFERENCE LIST 1 helicopter
1*a* multi-blade main rotor
1*b*, 1*c* rotor blades
1*d* rotor head
1*e* rotor shaft
1*f* landing gear
1*g* longitudinal extension direction
2 fuselage
2*a* cabin
2*b* rear fuselage
3 tail boom
3*a* horizontal stabilizer
3*b* tail boom cone
4 counter-torque device
4*a* tail rotor
5 fin
6 connection interface between tail boom and rear fuselage
6*a* interface plane
7 composite attachment ring segment
7*a* composite attachment ring segment length
7*b* clamp ring section
7*c* scarf section
7*d* composite attachment ring segment outer loft
7*e* lug portion length
8 composite attachment ring segment openings
8*a* cut-out
8*b* cut-out length
8*c* cut-out width
8*d* front cut-out end
8*e* rear cut-out end
9 tension members
9*a* tension bolt
9*b* tension bolt longitudinal axis
9*c* washer
9*d* bolt pitch
10 composite attachment ring segment mating face
11 tension member accommodations
11*a* through-hole
12 inter segment joint
13*a* tail boom cone outer loft
13*b* tail boom cone outer skin
13*c* tail boom cone inner skin
13*d* tail boom cone core
14 laminate line of action 15 applied membrane load
16 transition segment
16a transition segment thickness
16b scarf section thickness
17a clamp ring section thickness
17b clamp ring section length
17c clamping face
18 lug portion
18a lug portion width
18b lug portion width at clamp ring section
18c lug portion width at transition segment
19a inner layer
19b mid layer
19c outer layer
19d outer preform
19e inner preform
20 neutral line of cross section

What is claimed is:

1. A helicopter with a fuselage and a composite tail boom, the composite tail boom comprising at least a tubular tail boom cone and a composite attachment ring segment that defines a mating face, wherein the mating face is connected to the fuselage at an associated connection interface by means of a plurality of tension members that are oriented longitudinally with respect to a longitudinal extension direction of the composite tail boom, the plurality of tension members being distributed over a perimeter of the composite attachment ring segment, wherein the composite attachment ring segment comprises a clamp ring section with a plurality of tension member accommodations, the clamp ring section defining the mating face of the composite attachment ring segment, wherein the plurality of tension members is at least partly accommodated in the plurality of tension member accommodations, wherein the composite attachment ring segment defines a radial cross section with a neutral line that is essentially oriented in parallel to the longitudinal extension direction and that comprises deviation slopes of at most 1:5 with respect to the longitudinal extension direction, and wherein the clamp ring section comprises fiber layers that are at most deviated from the longitudinal extension direction by a slope of less than 1:5.

2. The helicopter of claim 1, wherein at least one accommodation of the plurality of tension member accommodations is embodied as a longitudinal through-hole.

3. The helicopter of claim 2, wherein the composite attachment ring segment comprises a scarf section that is arranged adjacent to the clamp ring section, wherein the scarf section comprises a plurality of openings, and wherein at least one opening of the plurality of openings is associated with the at least one accommodation of the plurality of tension member accommodations.

4. The helicopter of claim 3, wherein the at least one opening comprises a shaping that is adapted to allow insertion of at least one tension member of the plurality of tension members into the at least one accommodation via the at least one opening.

5. The helicopter of claim 4, wherein the at least one tension member comprises a tension bolt, wherein the at least one opening defines at least one essentially flat clamping face in the region of the clamp ring section that is at least approximately arranged in parallel to the mating face of the clamp ring section.

6. The helicopter of claim 5, wherein the tension bolt abuts the at least one essentially flat clamping face and/or at least one washer is arranged between the tension bolt and the at least one essentially flat clamping face.

7. The helicopter of claim 5, wherein the clamp ring section comprises at least in the region of the at least one accommodation a thickness that is at least 1.5 times greater than a diameter of the tension bolt.

8. The helicopter of claim 3, wherein the composite attachment ring segment is tubular, wherein the clamp ring section defines a maximum thickness of the tubular composite attachment ring segment, and wherein the scarf section comprises a variable thickness.

9. The helicopter of claim 8, wherein the variable thickness of the scarf section increases towards the clamp ring section.

10. The helicopter of claim 1, wherein the composite attachment ring segment comprises composite material with plies that are oriented at least essentially longitudinally with respect to a longitudinal extension direction and at least essentially in parallel to respective plies of composite material defining an outer and/or inner skin of the tubular tail boom cone with maximum deviation slopes of 1:5.

11. The helicopter of claim 3, wherein the at least one opening comprises a cross section that is shaped in the form of an elliptic paraboloid.

12. The helicopter of claim 11, wherein at least one lug portion is arranged in peripheral direction of the composite attachment ring segment between two peripherally adjacent openings of the plurality of openings, the at least one lug portion comprising a width that increases in a direction pointing away from the clamp ring section.

13. The helicopter of claim 1, wherein the clamp ring section is provided as an integral component of the tubular tail boom cone.

14. The helicopter of claim 13, wherein the clamp ring section and the tubular tail boom cone comprise at least one composite layer that extends from the tubular tail boom cone up to the mating face of the clamp ring section.

15. The helicopter of claim 1, wherein a transition segment is arranged between the composite attachment ring segment and the tubular tail boom cone, wherein the transition segment comprises a thickness that is at least 3 to 15 times smaller than a thickness of the clamp ring section.

* * * * *